(12) United States Patent
Park et al.

(10) Patent No.: US 8,880,376 B2
(45) Date of Patent: Nov. 4, 2014

(54) APPARATUS AND METHOD FOR DISTINGUISHING BETWEEN HUMAN BEING AND ANIMAL USING SELECTIVE STIMULI

(75) Inventors: Pil Jae Park, Daejeon (KR); Hyun Kyu Yu, Daejeon (KR); Seong Do Kim, Daejeon (KR); Sung Chul Woo, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 416 days.

(21) Appl. No.: 13/027,462

(22) Filed: Feb. 15, 2011

(65) Prior Publication Data

US 2011/0202302 A1 Aug. 18, 2011

(30) Foreign Application Priority Data

Feb. 18, 2010 (KR) .................. 10-2010-0014839
Jan. 13, 2011 (KR) .................. 10-2011-0003546

(51) Int. Cl.
| | |
|---|---|
| G01D 1/00 | (2006.01) |
| G06F 15/00 | (2006.01) |
| G06M 11/04 | (2006.01) |
| G06K 9/00 | (2006.01) |
| G08B 13/196 | (2006.01) |
| G01S 13/88 | (2006.01) |
| G08B 29/18 | (2006.01) |

(52) U.S. Cl.
CPC ......... *G01S 13/886* (2013.01); *G08B 13/19613* (2013.01); *G08B 29/185* (2013.01)
USPC .......................................... 702/127; 382/103

(58) Field of Classification Search
USPC .......................................... 702/127; 382/103
See application file for complete search history.

(56) References Cited

U.S. PATENT DOCUMENTS

| | | | |
|---|---|---|---|
| 4,625,199 | A | 11/1986 | Pantus |
| 5,473,311 | A | 12/1995 | Hoseit |
| 2005/0254687 | A1 | 11/2005 | Asama et al. |
| 2008/0048911 | A1 | 2/2008 | Sumi |
| 2009/0041297 | A1 | 2/2009 | Zhang et al. |
| 2009/0262189 | A1* | 10/2009 | Marman ................ 348/143 |

FOREIGN PATENT DOCUMENTS

| | | |
|---|---|---|
| JP | 2001-148842 A | 5/2001 |
| JP | 2005-056406 A | 3/2005 |
| JP | 2005-275912 A | 10/2005 |

(Continued)

OTHER PUBLICATIONS

Masahiro Nishi et al., "Human Detection System Using UHF Band Terrestrial TV Receiving Waves", 2006 IEE Antenna and Propagation symposium, 2006, pp. 3097-3100, IEE.

(Continued)

*Primary Examiner* — John Breene
*Assistant Examiner* — Manuel Rivera Vargas

(57) ABSTRACT

An apparatus and method for identifying a human being and an animal are disclosed to properly identifying whether or not a target is a human being or an animal. The apparatus for distinguishing between a human being and an animal includes: a target stimulation unit generating a stimulation signals for selectively stimulating the senses of a human being and an animal and providing the generated stimulation signal to a target; and a target identifying unit detecting the reaction of a target to the simulation signal to identify whether or not the target is a human being or an animal.

18 Claims, 3 Drawing Sheets

(56) References Cited

FOREIGN PATENT DOCUMENTS

| | | |
|---|---|---|
| JP | 2006-258562 A | 9/2006 |
| JP | 2007-000121 A | 1/2007 |
| JP | 2008-018111 A | 1/2008 |
| KR | 10-1995-0020210 A | 7/1995 |
| KR | 10-2000-0024550 A | 5/2000 |
| KR | 1020010001673 A | 1/2001 |
| KR | 2002-0082476 A | 10/2002 |
| KR | 1020030091394 A | 12/2003 |
| WO | 01/48719 A | 7/2001 |

OTHER PUBLICATIONS

Sevgi Zübeyde Gürbüz et al., "Comparison of Radar-Based Human Detection Techniques", ACSSC, 2007, pp. 2199-2203, IEE.

Luciano Spinello et al., "Human Detection using Multimodal and Multidimensional Features", IEEE Internation Conference on Robotics and Automation, May 19-23, 2008, pp. 3264-3269, IEE.

Nguyen Duc Thanh et al., "Human Detection Based on Weighted Template Matching", IEE International conference on Multimedia and Expo, 2009, pp. 634-637, IEEE.

* cited by examiner

APPARATUS AND METHOD FOR DISTINGUISHING BETWEEN HUMAN BEING AND ANIMAL USING SELECTIVE STIMULI

CROSS-REFERENCE TO RELATED APPLICATIONS

This application claims the priority of Korean Patent Applications No. 10-2010-0014839 filed on Feb. 18, 2010, and No. 10-2011-0003546 filed on Jan. 13, 2011 in the Korean Intellectual Property Office, the disclosures of which are incorporated herein by reference.

BACKGROUND OF THE INVENTION

1. Field of the Invention

The present invention relates to an apparatus for distinguishing between a human being and an animal to be utilized for a monitoring surveillance network, anti-crime monitoring equipment, and military monitoring equipment, and more particularly, to an apparatus and method for distinguishing between a human being and an animal capable of properly identifying whether or not a target is a human being or an animal by using selective stimuli.

2. Description of the Related Art

In general, a monitoring surveillance network, anti-crime monitoring equipment, and military monitoring equipment are systems for detecting an human being intruder and generating an alarming event. Thus, when a target is detected within a certain monitoring area, a method for identifying target as a human being is required.

Conventionally, a method for identifying target as a human being from other possible targets (e.g., an animal) using an image processing scheme has been proposed.

With this, an image of a target is captured, then the absolute size of the target is recognized by using the area and distance of the target. Finally, an identification step is followed based on the absolute size of the target. However, because this detection method merely uses the absolute size of the target, it has relatively low detection accuracy. In other words, there may be animals having a similar size to a human being in which the absolute size based identification method leads to an inaccuracy. Furthermore, the obtained image quality can be severely degraded depending on the weather conditions, especially at night. In an extreme case, a target may intentionally hide from an image capturing device. In these cases, an identification accuracy for a conventional method severely decreases.

SUMMARY OF THE INVENTION

An aspect of the present invention provides an apparatus and method for distinguishing between a human being and an animal capable of properly identifying whether or not a target is a human being or an animal by selectively stimulating the sense of the target and detecting the reaction of a target to the stimulation, in consideration of the fact that the cognition ranges of human and animal senses are different.

According to an aspect of the present invention, there is provided an apparatus for distinguishing between a human being and an animal, including: a target stimulation unit generating a stimulation signal for selectively stimulating the sense of a human being or an animal and providing the generated stimulation signal to a target; and a target identifying unit detecting the reaction of a target to the simulation signal to identify whether or not the target is a human being or an animal.

The target stimulation unit may regulate an output direction and an output strength of the stimulation signal.

The target stimulation unit may include: a stimulation signal generation unit generating the stimulation signal; and a stimulation signal output unit outputting the stimulation signal.

The stimulation signal output unit may be implemented as a beamforming antenna for controlling an output direction and an output strength of the stimulation signal according to a beamforming method. Also, The stimulation signal output unit may be implemented a directional sound wave generator for controlling the output direction and the output strength of the stimulation signal according to a phase shifting method.

The stimulation signal output unit may include: an output unit outputting the stimulation signal; and a detection area controller changing a detection area by controlling the direction and position of the output unit.

The stimulation signal output unit may include: a plurality of output units outputting the simulation signal, respectively; and a detection area controller changing a detection area by determining whether to operate each of the plurality of output units.

The target identifying may include: a reaction detection unit analyzing a movement pattern of the target to detect the reaction of a target; and a reaction analyzing unit identifying whether or not the target is a human being or an animal in consideration of the type of the stimulation signal and the detection results from the reaction detection unit.

The target identifying unit may obtain an image of the target by using at least one of a visible light camera, an infrared camera and a heat image camera, and recognize a motion pattern of the target from the image.

The target identifying unit may recognize the location of the target by using at least one of an ultrasonic sensor, a radar sensor, and a laser sensor, and track the location of the target to recognize a movement pattern of the target.

According to an aspect of the present invention, there is provided a method for identifying a human being and an animal, including: generating a stimulation signal for selectively stimulating the sense of a human being or an animal and providing the generated stimulation signal to a detection target; and detecting the reaction of a target to the stimulation signal to identify whether or not the target is a human being or an animal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
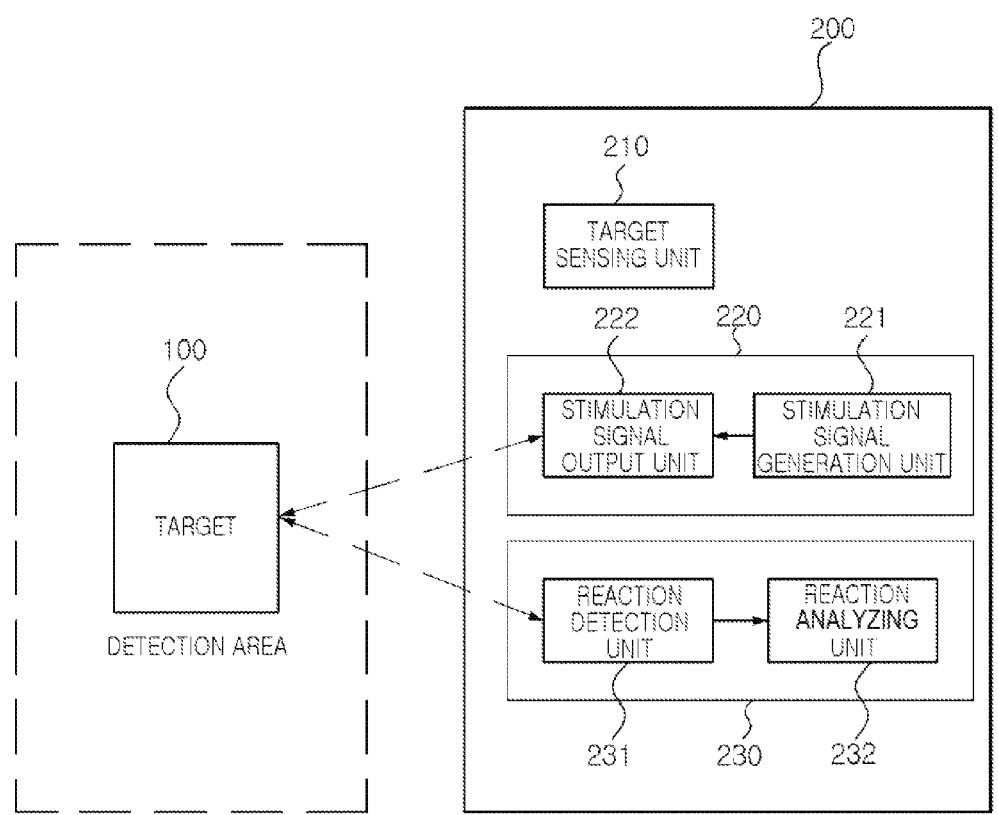
FIG. 1 is a schematic block diagram of an apparatus for distinguishing between a human being and an animal according to an exemplary embodiment of the present invention.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a schematic block diagram of an apparatus for distinguishing between a human being and an animal according to an exemplary embodiment of the present invention.

With reference to FIG. 1, an apparatus for distinguishing between a human being and an animal includes a target sensing unit 210, a target stimulation unit 220, a target identifying unit 230, and the like. The apparatus for distinguishing between a human being and an animal selectively stimulates the senses of a human being or an animal (e.g., the sense of hearing, the sense of smell, the sense of sight, etc.) and detects a reaction of a target, to thus identify whether or not the target is a human being or an animal.

Functions of each element are as follows.

The target sensing unit 210 is installed in a detection area and senses whether or not there is a target 100 in the detection area. And the target sensing unit 210 is configured as sensors for sensing the presence of a human being and an animal, such as an ultrasonic sensor, a laser sensor, a radar sensor, a thermal sensor, and the like.

The target stimulation unit 220 generates stimulation signals for selectively stimulating the senses of a human being or an animal and provides it to the target 100. The target stimulation unit 220 may include a simulation signal generation unit 221 and a simulation signal output unit 222.

The simulation signal generation unit 221 generates a simulation signals for selectively stimulating the senses of a human being or an animal. Basically, animals' sense cognition ability is well developed as compared with human beings. For example, human beings have an audible frequency band of 20 Hz to 20 kHz, while animals such as cats have an audible frequency band of 60 Hz to 60 kHz.

Thus, the stimulation signal generation unit 221 may implement a stimulation signal as a sound and arbitrarily adjusts a frequency band of the sound to stimulate only the sense of hearing of a human being or an animal. Namely, when only the sense of hearing of an animal is intended to be stimulated, a sound having an ultrasonic wave band of 20 kHz or higher (or a sound having an infrasonic wave band of 20 Hz or lower) may be generated and output. And when only the sense of hearing of a human being is intended to be stimulated, a sound having a frequency band of 20 Hz to 50 Hz may be generated and output.

Of course, the stimulation signal generation unit 221 can variably change the stimulation signal type within a range in which the senses of a human being or animal (namely, the sense of hearing, the sense of smell, the sense of sight, etc.) are selectively stimulated. Namely, the stimulation signal type can variably change the form of a smell for selectively stimulating the sense of smell of a human being or an animal, the form of an image or light for selectively stimulating the sense of sight of a human being or an animal, and the like.

The stimulation signal output unit 222 provides a stimulation signal generated by the stimulation signal generation unit 221 to the target 100.

Figure 2A:
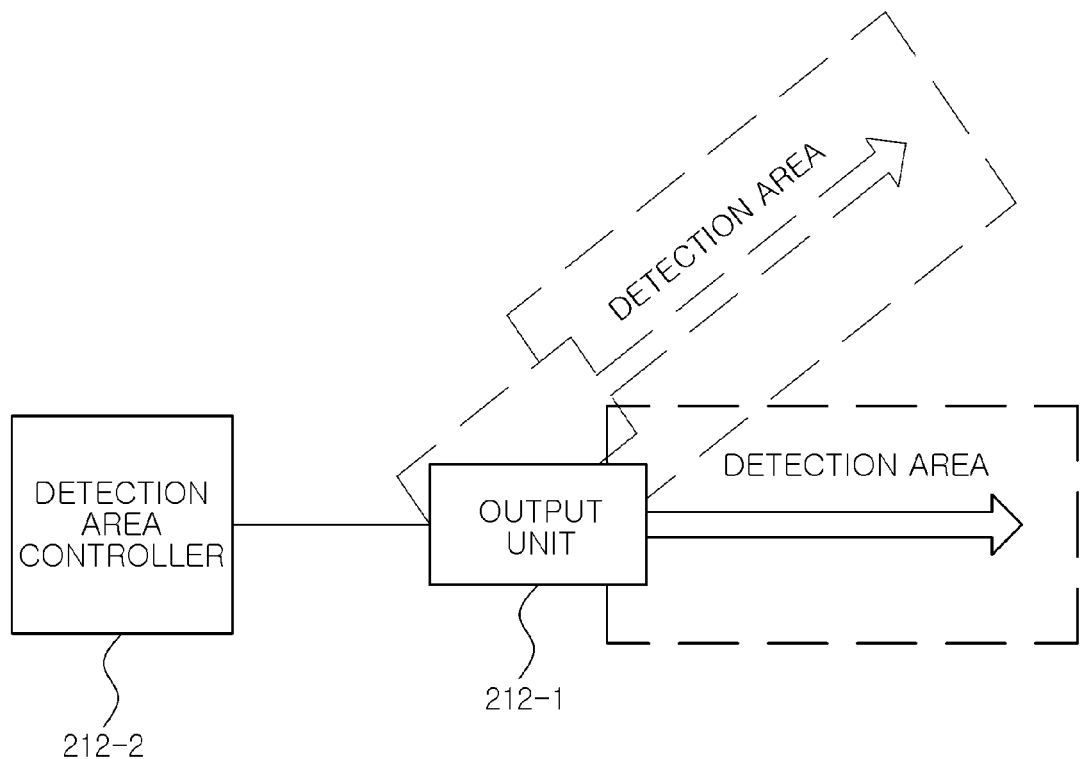
FIGS. 2A and 2B are views showing implementation examples of a stimulation signal output unit according to an exemplary embodiment of the present invention.
Figure 2B:
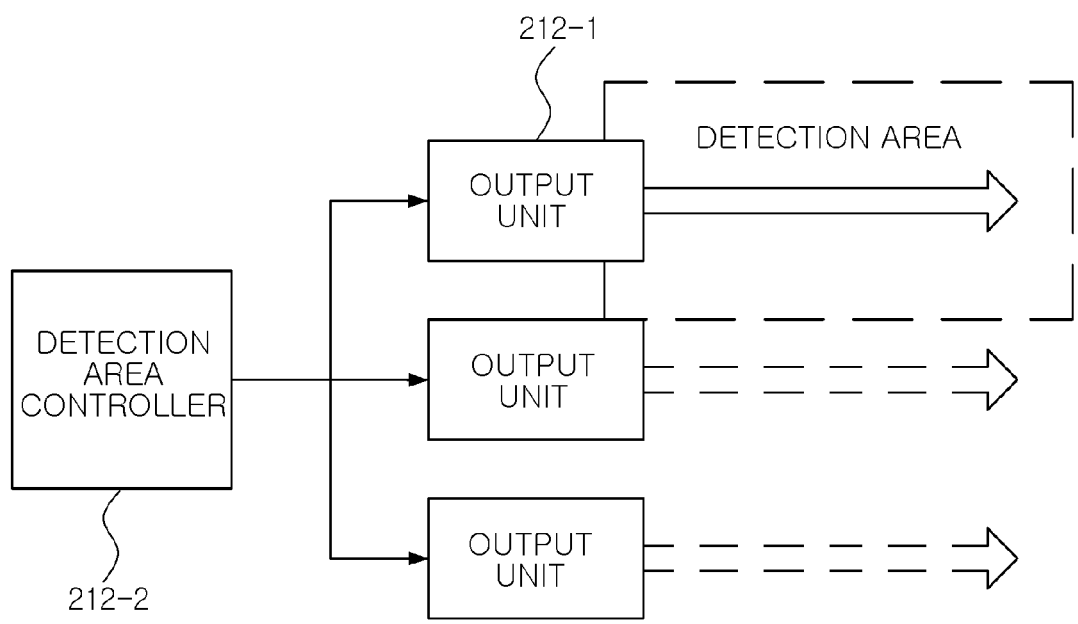

Also, the stimulation signal output unit 222 may adjust an output direction and an output amplitude (or output strength) of the stimulation signal in order to actively vary a detection area. In these cases, the stimulation signal output unit 222 may be implemented as a beamforming antenna for controlling the output direction and output amplitude of the stimulation signal in a beamforming manner, or may be implemented as a directional sound wave generator (or a directional supersonic generator) for controlling the output direction and output amplitude of the stimulation signal in a phase-varying manner. Also, as shown in FIG. 2A, the stimulation signal output unit 222 may include an output unit 222-1 for outputting a stimulation signal and a detection area controller 222-2 for mechanically controlling the direction and location of the output unit 222-1. Or else, as shown in FIG. 2B, the stimulation signal output unit 222 may include a plurality of output units 222-1 for outputting a stimulation signal, respectively, and a detection area controller 222-2 for determining whether to operate each of the plurality of output units 222-1.

The reaction detection unit 231 detects whether or not the target 100 reacts to the stimulation signal by using an image processing method or a distance measurement method.

When the reaction detection unit 231 performs reaction detecting operation based on the image processing method, the reaction detection unit 231 captures an image of the target 100 by using a camera and tracks movement patterns of the target 100 (e.g., the location of the target 100, a speed of the movement of the target 100, a direction of movement of the target 100, etc.) through an image processing algorithm, to thereby check whether or not the target 100 reacts to the current stimulation signal. The camera can be implemented as at least one of a visible light camera, an infrared camera, and a heat image camera, and the image processing algorithm follows the conventionally known art and a detailed description thereof will be omitted.

Meanwhile, when the reaction detection unit 231 performs reaction detecting operation based on the distance measurement method, the reaction detection unit 231 measures the distance between the target 100 and the reaction detection unit 231 by using an ultrasonic sensor, a radar sensor, or a laser sensor, and continuously tracks the distance between the target 100 and the reaction detection unit 231, to thereby check whether or not the target 100 reacts to the current stimulation signal.

Namely, the reaction detection unit 231 determines whether or not the target 100 rapidly moves in reaction to the stimulation signal, thus easily checking whether or not the target 100 reacts to the current stimulation signal.

The reaction analyzing unit 232 identifies whether or not the target 100 is a human being or an animal in consideration of the type of the stimulation signal and the detection results of the reaction detection unit 231. Namely, the reaction analyzing unit 232 checks whether or not the stimulation signal is to stimulate the human being's sense or the animal's sense, and then recognizes whether or not the target 100 reacts to the stimulation signal. When the target 100 selectively reacts to the stimulation signal for stimulating the human being's sense, the reaction analyzing unit 232 determines that the target 100 is a human being, while when the target 100 reacts to the stimulation signal for stimulating the animal's sense, the reaction analyzing unit 232 determines that the target 100 is an animal.

Figure 3:
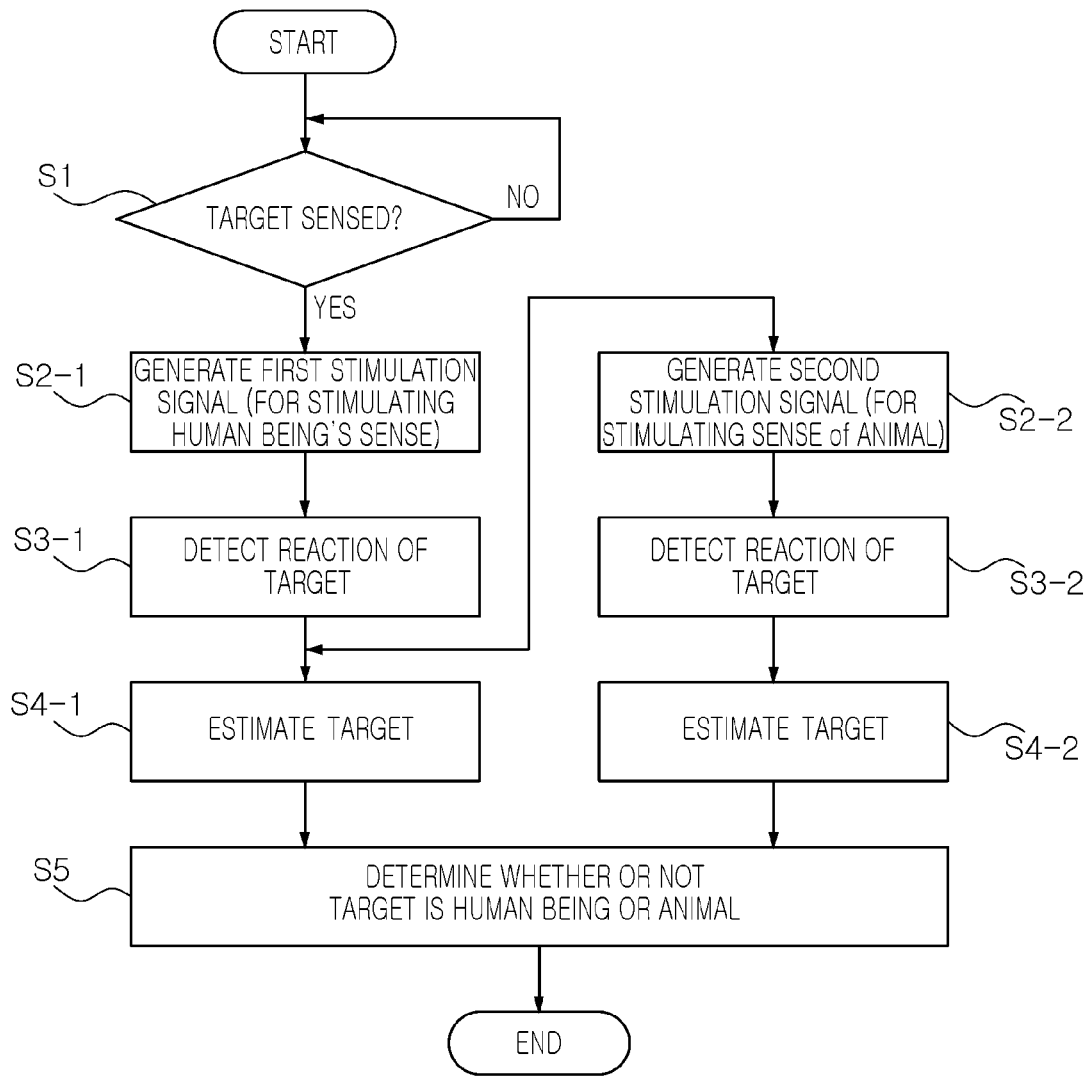
FIG. 3 is a flow chart illustrating the process of a method for identifying a human being and an animal according to an exemplary embodiment of the present invention.

FIG. 3 is a flow chart illustrating the process of a method for identifying a human being and an animal according to an exemplary embodiment of the present invention.

When the target sensing unit 210 provides information that there is a target 100 to be detected (step S1), the target stimulation unit 220 generates a first stimulation signal for stimulating only the human being's sense and outputs the generated first stimulation signal to check whether or not the target 100 is a human being (step S2-1)

The target identifying unit 230 detects whether or not the target 100 reacts to the first stimulation signal (step S3-1). When the target 100 moves in order to avoid or eliminate the first stimulation signal in reaction thereto, the target identifying unit 100 estimates that the target is a human being, while when the target 100 does not make any reaction to the first simulation signal, the target identifying unit 230 estimates that the target 100 is an animal (step S4-1).

Then, the target stimulation unit 220 generates a second stimulation signal to stimulate only the animal's sense and outputs the generated second stimulation signal to check whether or not the target 100 is an animal (step S2-2).

The target identifying unit 230 detects whether or not the target reacts to the second stimulation signal (step S3-2). When the target 100 rapidly moves in reaction to the second stimulation signal, the target identifying unit 230 estimates that the target 100 is an animal, while if the target 100 does not make any reaction to the second stimulation signal, the target identifying unit 230 estimates that the target 100 is a human being (step S4-2).

Finally, the estimation results in step S4-1 and the estimation results in step S4-2 are gathered together to finally determine whether or not the target 100 is a human being or an animal (step S5).

In the exemplary embodiment of FIG. 3, two stimulation signals are provided, but in an actual application, one stimulation signal or three or more stimulation signals may be used.

As set forth above, in the apparatus and method for identifying a human being and an animal according to exemplary embodiments of the invention, the sense of a target is selectively stimulated and whether or not the target reacts thereto is detected in consideration of the fact that the cognition ranges of human and animal senses are different, whereby the target can be precisely identified whether or not target is a human being or an animal. Monitoring surveillance network, anti-crime monitoring equipment, and military monitoring equipment employing the apparatus and method for identifying a human being and an animal according to the present invention can precisely identify whether or not a target is a human being or an animal, and can generate an alarm event only in the case of a human being's intrusion, thereby providing improve anti-crime and surveillance function.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for distinguishing between a human being and a non-human animal, the apparatus comprising:
a target stimulation unit configured to generate a stimulation signal that selectively stimulates only one of either a sense of a human being or a sense of a non-human animal, and to output the generated stimulation signal to a target; and
a target identifying unit configured to detect a reaction of the target to the stimulation signal and determine whether the target is a human being or a non-human animal based on the detected reaction.

2. The apparatus of claim 1, wherein the target stimulation unit comprises:
a stimulation signal generation unit generating the stimulation signal; and
a stimulation signal output unit outputting the stimulation signal.

3. The apparatus of claim 2, wherein the stimulation signal output unit is implemented as a beamforming antenna, the beamforming antenna controlling an output direction and an output strength of the stimulation signal according to a beamforming method.

4. The apparatus of claim 2, wherein the stimulation signal output unit comprises:
an output unit configured to output the stimulation signal; and
a detection area controller configured to change a detection area by controlling a direction and a position of the output unit.

5. The apparatus of claim 2, wherein the stimulation signal output unit comprises:
a plurality of output units outputting the stimulation signal, respectively; and
a detection area controller changing a detection area by determining whether to operate each of the plurality of output units.

6. The apparatus of claim 2, wherein the stimulation signal output unit includes a directional sound wave generator, the directional sound wave generator controlling the output direction and the output strength of the stimulation signal according to a phase shifting method, and
wherein the stimulation signal controlled by the directional sound wave generator is an ultrasonic signal.

7. The apparatus of claim 1, wherein the target identifying unit comprises:
a reaction detection unit configured to analyze a movement pattern of the target to detect the reaction of the target; and
a reaction analyzing unit configured to determine whether the target is a human being or a non-human animal based on a type of the stimulation signal and the detected reaction from the reaction detection unit.

8. The apparatus of claim 7, wherein the target identifying unit obtains an image of the target by using at least one of a visible light camera, an infrared camera, and a heat image camera, and recognizes a motion pattern of the target from the image.

9. The apparatus of claim 7, wherein the target identifying unit recognizes a location of the target by using at least one of an ultrasonic sensor, a radar sensor, and a laser sensor, and tracks the location of the target to recognize the movement pattern of the target.

10. The apparatus of claim 1, wherein the target stimulation unit regulates an output direction and an output strength of the stimulation signal.

11. The apparatus of claim 1, wherein the stimulation signal that selectively stimulates the sense of a human being is a wavelength of radiation that is outside the limits of sensory perception of at least one non-human animal and inside the limits of sensory perception of the human being.

12. A method for identifying a human being and a non-human animal, the method comprising:
generating a stimulation signal which selectively stimulates only one of either a sense of a human being or a sense of a non-human animal;
providing the generated stimulation signal to a target;
detecting, by a processor, a reaction of the target to the stimulation signal by analyzing a movement pattern of the target; and
determining whether the target is a human being or a non-human animal based on the reaction of the target to the stimulation signal.

13. The apparatus of claim 12, wherein the target stimulation unit is configured to generate a first stimulation signal and a second stimulation signal, the first stimulation signal being configured to stimulate only a sense of a human being, and the second stimulation signal being configured to stimulate only a sense of a non-human animal, and wherein the target identifying unit is configured to detect whether or not the target reacts to the first stimulation signal and the second stimulation signal, estimate the target is a human being if the reaction to the first stimulation signal is detected, estimate the target is a non-human animal if the reaction to the second stimulation signal is detected, and determine whether the target is a human being or a non-human animal based on a result of the estimation that the target is a human being and the estimation that the target is a non-human animal.

14. The method of claim 12, further comprising tracking a movement pattern of the target using any of a sensor and a camera.

15. The method of claim 12, wherein the reaction of the target is detected using any of an ultrasonic sensor, a radar sensor, a laser sensor, a visible light camera, an infrared camera, and a heat image camera.

16. The method of claim 12, wherein the stimulation signal that selectively stimulates the sense of the non-human animal is a wavelength of radiation that is outside the limits of sensory perception of the human being and inside the limits of sensory perception of at least one non-human animal.

17. An apparatus for distinguishing between a human being and a non-human animal, the apparatus comprising:

a target stimulation unit configured to generate a stimulation signal that selectively stimulates only one of either a sense of a human being or a sense of a non-human animal, and to output the generated stimulation signal to a target; and a target identifying unit configured to detect a reaction of the target to the stimulation signal and determine whether the target is a human being or a non-human animal based on the detected reaction, wherein the target stimulation unit is configured to generate a first stimulation signal and a second stimulation signal, the first stimulation signal being configured to stimulate only a sense of a human being, and the second stimulation signal being configured to stimulate only a sense of a non-human animal.

18. A method for identifying a human being and a non-human animal, the method comprising:

generating a stimulation signal which selectively stimulates only one of either a sense of a human being or a sense of a non-human animal;

providing the generated stimulation signal to a target;

detecting, by a processor, a reaction of the target to the stimulation signal by analyzing a movement pattern of the target; and determining whether the target is a human being or a non-human animal based on the reaction of the target to the stimulation signal, wherein generating the stimulation signal comprises:

generating a first stimulation signal configured to stimulate the sense of a human being; and generating a second stimulation signal configured to stimulate the sense of a non-human animal; and estimating that the target is a human being or a non-human animal based on the reaction of the target to the first stimulation signal and the second stimulation signal.

* * * * *